3,532,640
GRAPHITE SUSPENSION FOR THE CONDUCTING INNER LAYER OF CATHODE RAY TUBES
Erich Scharrer and Günter Kossow, Aachen, and Günter Plura, Eilendorf, Germany, assignors, by mesne assignments, to U.S. Philips Corporation, New York, N.Y., a corporation of Delaware
No Drawing. Filed Sept. 19, 1967, Ser. No. 668,926
Claims priority, application Germany, Sept. 29, 1966, P 40,465
Int. Cl. H01b *1/06;* C09c *1/44*
U.S. Cl. 252—506                                                 4 Claims

ABSTRACT OF THE DISCLOSURE

A graphite suspension for the conductive coating of a cathode-ray tube consisting in addition to graphite, a metal oxide such as zinc oxide, an inorganic, heat resisting adhesive such as a silicate, phosphate or borate, finely dispersed silicic acid and soot to delay sedimentation of the suspension.

---

The invention relates to a graphite-suspension for the conductive inner layer of cathode ray tubes, which suspension consists of a conducting substance of mineral and/or synthetic graphite, a filler consisting of a metal oxide and an inorganic heat resisting adhesive, consisting of a silicate, a phosphate or a borate.

Graphite suspensions suitable for the purpose mentioned are known per se (from the German patent specifications 1,163,501 and 1,169,619). These known graphite-suspensions are mainly used for monochrome picture tubes in which tubes they meet the requirements very well. However, the graphite layer in color display tubes must satisfy much higher demands as the entire cone of the tube has to be covered with the graphite suspension. Difficulties are here encountered as a result of the fact, that most of the known suspensions contain organic substances. The difficulties are noticeable in that the emission is affected in an undesirable manner or in case the surface-hardness is poor, in that flash over may occur when graphite dust is set free from the covered surface. For these reasons a graphite-suspension is needed which is free from these shortcomings and defects and at the same time meets the further desired requirements, namely that the suspension properly sticks to the glass and provides a low contact resistance between the terminals to be fixed, for example between the anode terminal and the graphite layer as well as between the contact springs of the electron gun and the graphite layer. Moreover it is necessary that the suspension can be easily applied so that a uniform coverage is obtained, without cracks and streaks. The suspension should furthermore show little tendency to form droplets. As a final requirement to be mentioned it must be possible to effectively degas the layer and the layer must not give off gas in vacuum.

To blacken the inner wall of cathode ray tubes it is well known to use carbon with inorganic substances. For example (from German patent specification 699,570) the use of a glass ink is known consisting of carbon compounds or black aniline dyes, which are dissolved in solutions of hydrofluoric acids. Also a method for electrogalvanically coating an object made of non-conducting materials with a metal layer is known (from German patent specification 207,290) according to which a conducting coating of finely divided graphite, carbon or metal particles is applied and according to which the conducting substances are mixed with alkali-silicates such as waterglass.

The invention is based on this known prior art and relates to a graphite-suspension of the above mentioned kind. The invention is characterized in that, in order to delay the sedimentation, the suspension contains in addition finely dispersed silicic acid (lamp black) and soot. These additions to the graphite suspension are very important while by slowing down the sedimentation the suspension is stabilised. Moreover due to the fineness of granulation of both these substances, an improved surface condition of the layer is obtained and more particularly due to the soot, the covering power of the layer is increased.

According to the invention the graphite suspension may contain the following components 5 to 40% by weight of graphite
1 to 15% by weight of zinc oxide
0.5 to 7% by weight of finely dispersed silicic acid
1 to 10% by weight of soot
25 up to and including 60 weight percent waterglass
20 up to and including 50 weight percent deionised water.

The conducting substance of the graphite-suspension according to the invention may consist of a mixture of graphite powder having different grain size. Moreover a zinc oxide stabilised in a phosphate solution can be used as the metal oxide.

In using the graphite suspension according to the invention a graphite layer is obtained which sticks considerably better to the glass. The surface hardness is also improved. Also the stability of the layer in high vacuum is improved. Some possible compositions of a graphite suspension according to the invention are indicated in the table here below.

| Compositions in weight percent | I | II | III |
|---|---|---|---|
| Graphite | 20.0 | 14.0 | 7.6 |
| Zinc oxide | 3.2 | 7.0 | 11.4 |
| Highly dispersed silicic acid | 1.3 | 2.8 | 4.5 |
| Soot (lamp black) | 2.6 | 2.8 | 3.1 |
| Waterglass | 48.7 | 48.7 | 48.7 |
| Deionised water | 24.2 | 24.7 | 24.7 |

As conducting substance mineral or synthetic graphite with a grain size distribution as indicated below is preferably used: about 40 weight percent grains smaller than $5\mu$, 13 weight percent between 5 and $10\mu$; 17 weight percent between 10 and $20\mu$, the remaining being between 20 and $50\mu$.

What is claimed is:
1. A graphite suspension for the conductive inner layer of cathode ray tubes, said suspension consisting of a conducting graphite material, a filler composed of a metal oxide and an inorganic heat resisting adhesive selected from the group consisting of a silicate, a phosphate and a borate, said suspension containing in addition finely dispersed silicic acid and soot to delay sedimentation thereof.

2. A graphite suspension as claimed in claim 1, characterized in that it contains the following components:

5 to 40 weight percent graphite
1 to 15 weight percent zinc oxide
0.5 to 7 weight percent silicic acid
1 to 10 weight percent soot
25 to 60 weight percent waterglass
20 to 50 weight percent deionized water.

3. A graphite suspension as claimed in claim 2 in which the conducting substance consists of a mixture of graphite powders with the following grain size distribution: 40 weight percent grains smaller than $5\mu$; 13 weight percent between 5 and $10\mu$; 17 weight percent between 10 and $20\mu$ and the remainder between 20 and $50\mu$.

4. A graphite suspension as claimed in claim 3 in which a zinc oxide, stabilized in a phosphate solution, is used as the metal oxide.

References Cited

UNITED STATES PATENTS

| | | | |
|---|---|---|---|
| 2,196,128 | 4/1940 | Stuart | 252—506 |
| 2,883,307 | 4/1959 | Orr | 117—226 |
| 2,951,773 | 9/1960 | Helle et al. | 252—506 |
| 3,108,906 | 10/1963 | Scharrer et al. | 117—226 |
| 3,112,208 | 11/1963 | Johnson | 252—502 |

DOUGLAS J. DRUMMOND, Primary Examiner

U.S. Cl. X.R.

117—226